United States Patent
Poorman

(10) Patent No.: US 8,730,615 B1
(45) Date of Patent: May 20, 2014

(54) BIDIRECTIONAL READ/WRITE HEADS HAVING BACKWARD READING COMPATIBILITY

(71) Applicant: Hewlett-Packard Development Company, L.P., Houston, TX (US)

(72) Inventor: Paul W. Poorman, Meridien, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/660,738

(22) Filed: Oct. 25, 2012

(51) Int. Cl.
*G11B 5/10* (2006.01)
*G11B 5/265* (2006.01)

(52) U.S. Cl.
USPC .......................................... 360/121; 360/129

(58) Field of Classification Search
USPC .............. 360/121, 129, 90, 122, 130.21, 231
See application file for complete search history.

(56) References Cited

U.S. PATENT DOCUMENTS

| | | | |
|---|---|---|---|
| 4,685,005 A * | 8/1987 | Fields, Jr. | 360/53 |
| 5,771,142 A * | 6/1998 | Maurice et al. | 360/121 |
| 6,331,920 B1 | 12/2001 | Albrecht et al. | |
| 7,154,691 B2 * | 12/2006 | Girvin et al. | 360/61 |
| 7,602,579 B2 * | 10/2009 | Biskeborn et al. | 360/77.12 |
| 7,724,465 B2 | 5/2010 | Koeppe | |
| 7,760,465 B2 * | 7/2010 | Koeppe | 360/121 |
| 8,243,385 B2 * | 8/2012 | Biskeborn et al. | 360/121 |
| 2005/0134989 A1 * | 6/2005 | Girvin et al. | 360/61 |
| 2012/0019967 A1 | 1/2012 | Bandy, IV et al. | |

* cited by examiner

*Primary Examiner* — Jefferson Evans

(57) ABSTRACT

Systems and methods related to magnetic tape heads are provided. A first process forms a first read module on a substrate in accordance with a prior generation recording format. A second process, different than the first, forms a second read module on a substrate in accordance with a present generation recording format. The first and second read modules are directly bonded in parallel such that a single continuous tape reading zone is defined. Write modules can be formed and disposed on opposite sides of and aligned with the tape reading zone. Bidirectional read/write heads, having backward reading compatibility, can be made and used accordingly.

10 Claims, 4 Drawing Sheets

BIDIRECTIONAL READ/WRITE HEADS HAVING BACKWARD READING COMPATIBILITY

BACKGROUND

Magnetic recording tape continues to be utilized in areas such as mass data storage, and the like. Information is recorded onto tape as a set of parallel tracks, and track density and count are increasing as the technology evolves. However, backward compatibility with prior generations of recording formats is desirable.

BRIEF DESCRIPTION OF THE DRAWINGS

The present embodiments will now be described, by way of example, with reference to the accompanying drawings, in which.

DETAILED DESCRIPTION

Introduction

Systems and methods related to magnetic tape heads are provided. A first process is used to form a first read module on a substrate, in accordance with a prior generation recording format. A second process, different than the first, is used to form a second read module in accordance with a present generation recording format. The first and second processes can be defined by respectively varying steps, annealing parameters, or other characteristics.

Respective faces, or film sides, of the first and second read modules are bonded directly together, in parallel, such that a single, essentially continuous tape reading zone is defined. Write modules can be formed and disposed on opposite sides of and aligned with the tape reading zone. Bidirectional read/write heads, having backward reading compatibility, can be made and used accordingly.

In one example, a method includes forming a first module by way of a first process. The first module has a plurality of read elements to read magnetically recorded information of a first format, and the first module is defined by a first face. The method also includes forming a second module by way of a second process different than the first process. The second module has a plurality of read elements to read magnetically recorded information of a second format, the second module defined by a second face. A track density of the second format is greater than a track density of the first format. The method further includes joining the first and second modules by directly bonding respective portions of the first and second faces to each other such that respective rows of the read elements are in parallel orientation with each other defining a single tape bearing surface.

In another example, a magnetic tape head includes a first read module having a plurality of first read elements arranged in a row according to a first track density format. Also included is a second read module having a plurality of second read elements arranged in a row according to a second track density format different than the first track density format. Respective portions of the first and second read modules are directly bonded to each other such that the first and second read elements are aligned in parallel and define a single continuous tape reading zone.

First Illustrative Read Module

Figure 1:
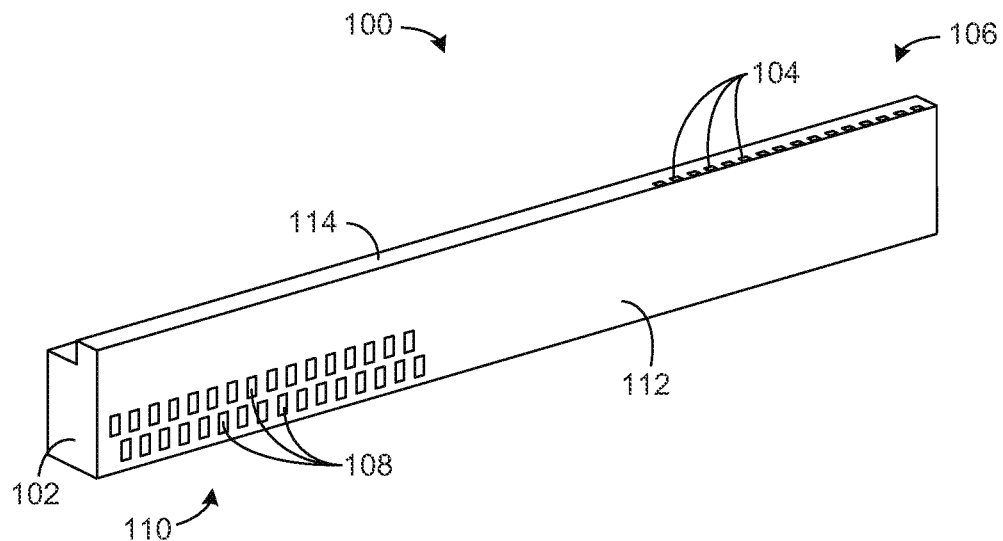
FIG. 1 depicts an isometric-like diagram of a read module according to one example of the present teachings.

Attention is directed now to FIG. 1, which depicts a read module (module) 100 according to the present teachings. The module 100 is illustrative and non-limiting with respect to the present teachings. Other read modules or respectively varying features, configurations, or formative processes can also be used.

The module 100 is formed upon a semiconductor substrate 102. In one example, the substrate 102 is a portion of an AlTiC (Aluminum Oxide—Titanium Carbide) wafer. Other suitable substrates can also be used. The module 100 includes a plurality of read elements 104 formed by way of processing the substrate 102. In one example, the read elements 104 are formed by way of an Anisotropic Magneto-Resistive (AMR) process. Other suitable formative processes can also be used.

As depicted, the module 100 includes sixteen read elements 104 arranged in a row-like linear distribution along a raised feature 114, toward an end 106 of the module 100. The electrical characteristics of the read elements 104 and their arrangement on the module 100 are in accord with a recording track density of a prior generation. Thus, the module 100 is configured for backward compatibility with a relatively older magnetic tape recording format. The read module 100 is therefore also referred to as a backward compatible (BWC) read module 100 for purposes herein.

The module 100 also includes a plurality of bond pads 108 disposed toward another end 110, opposite the end 106. The bond pads 108 are supported on a face (or film side) 112 of the module 100 and define respective pairs. Each pair of bond pads 108 is electrically coupled (or connected) with a corresponding one of the read elements 104. Thus, the illustrative module 100 includes thirty-two total bond pads 108 defining sixteen respective pairs, corresponding to the sixteen read elements 104 (i.e., sixteen channels).

Second Illustrative Read Module

Figure 2:
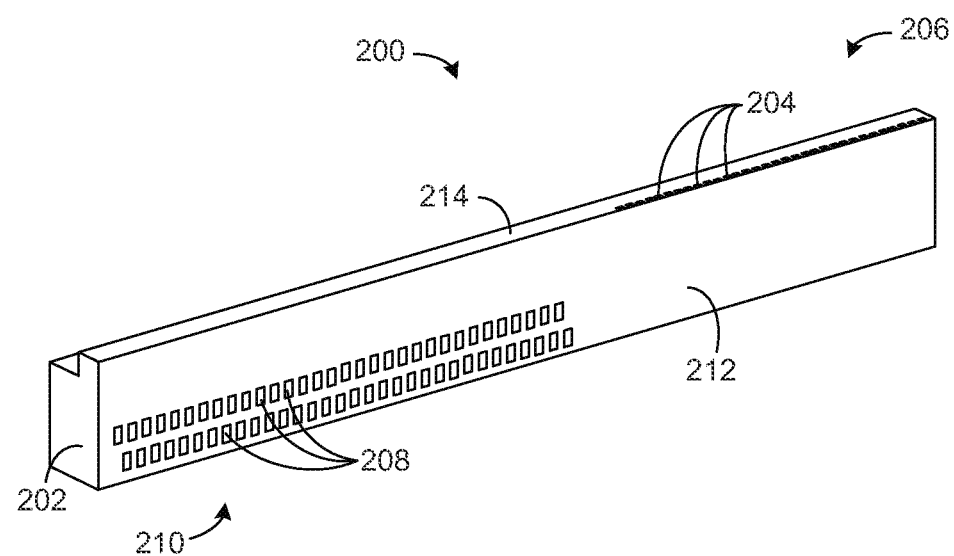
FIG. 2 depicts an isometric-like diagram of another read module according to the present teachings.

Reference is now made to FIG. 2, which depicts a read module (module) 200 according to the present teachings. The module 200 is illustrative and non-limiting with respect to the present teachings. Other read modules or respectively varying features, configurations, or formative processes can also be used.

The module 200 is formed upon a semiconductor substrate 202. In one example, the substrate 202 is a portion of an AlTiC (Aluminum Oxide—Titanium Carbide). Other suitable substrates can also be used. The module 200 includes a plurality of read elements 204 formed by way of processing the substrate 202. In one example, the read elements 204 are formed by way of a Giant Magneto-Resistive (GMR) process. Other suitable formative processes can also be used. As depicted, the module 200 includes thirty-two read elements 204 arranged in a row-like linear distribution along a raised feature 214, toward an end 206 of the module 200.

The electrical characteristics of the read elements 204 and their arrangement on the module 200 are in accord with a recording track density of a present (or state-of-the-art) generation. Therefore, the module 200 is configured for compatibility with a present or relatively newer magnetic tape recording format. The read module 200 is thus also referred to as a native-mode read module 200 for purposes herein.

The module 200 also includes a plurality of bond pads 208 disposed toward another end 210, opposite the end 206. The bond pads 208 are supported on a face (or film side) 212 of the module 200 and define respective pairs. Each pair of bond pads 208 is electrically coupled (or connected) with a corresponding one of the read elements 204. Thus, the illustrative module 200 includes sixty-four total bond pads 208 defining thirty-two respective pairs, corresponding to the thirty-two read elements 204 (i.e., thirty-two channels). Other native-mode modules can be formed via GMR processing having respectively different read element counts (e.g., sixteen, twenty-four, and so on). Thus, different track densities and/or spacing can be accommodated.

The read modules 100 and 200 as described above can be formed from different processes such as, for example, AMR and GMR, respectively. In particular, the process used to form the read module 100 can include annealing parameters (e.g., temperature, dwell time, magnetic field intensity, and so on), that vary from annealing parameters used to form the read module 200. Forming the respective modules 100 and 200 under separate and distinct processes allows for optimized conditions (or nearly so) that are not damaging or otherwise detrimental to each other.

Illustrative Dual Module Configuration

Figure 3:
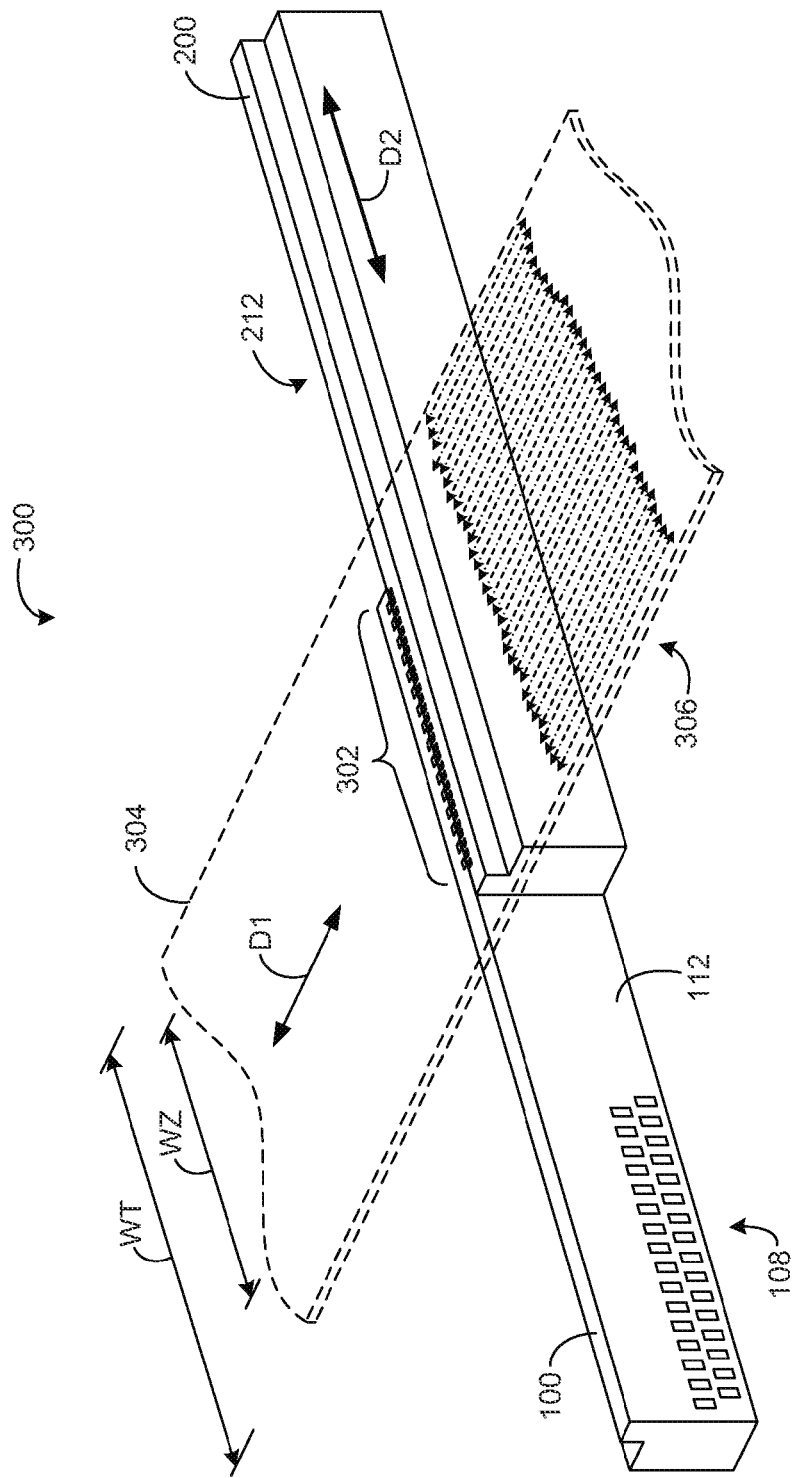
FIG. 3 depicts an isometric-like diagram of an arrangement including two different read modules according to the present teachings.

Attention is directed now to FIG. 3, which depicts a dual module configuration (or arrangement) 300 according to the present teachings. The arrangement 300 is illustrative and non-limiting with respect to the present teachings. Thus, other arrangements having respectively varying configurations or constituencies can also be used.

The arrangement 300 includes the read module 100 and the read module 200 as respectively described above. The module 100 is disposed in parallel and partially overlapping (i.e., offset) relationship with the module 200, such that portions of the respective faces 112 and 212 are bonded in direct contact with each other. That is, the modules 100 and 200 are bonded in film side-to-film side orientation.

The offset relationship of the modules 100 and 200 is such that the respective pluralities of bond pads 108 and 208 (see FIG. 2) are disposed apart from each other, proximate to opposite ends of the arrangement 300. The respective rows of read elements 104 and 204 are in parallel alignment with each other so as to define a tape reading zone 302. The tape reading zone 302 defines a single (i.e., seamless) tape bearing surface resulting from the direct bonding of the modules 100 and 200 to each other.

The arrangement 300 typically, but not exclusively, defines a "core" or centralize feature of a read/write tape head, as illustrated and described hereinafter. A magnetic recording tape 304, having information encoded thereon as respective tracks 306, can be read by way of appropriate ones of the read elements 104 (BWC) or 204 (native mode), depending upon the track density, recording format, and so on. Such a tape 304 can be passed bidirectionally (i.e., arrow "D1") over the tape reading zone 302.

In turn, the arrangement 300 (e.g., as a part of a read/write head) can be bidirectionally positioned (i.e., arrow "D2") to establish and maintain correspondence between ones of the read elements 104 (or 204) and tracks 306 of information to be read from the tape 304. It is noted that the track reading zone 302 is defined by a width "WZ", which is less than an overall width "WT" of the tracks 306 (i.e., the illustrative recording format).

Illustrative Circuit Wiring Configuration

Figure 4:
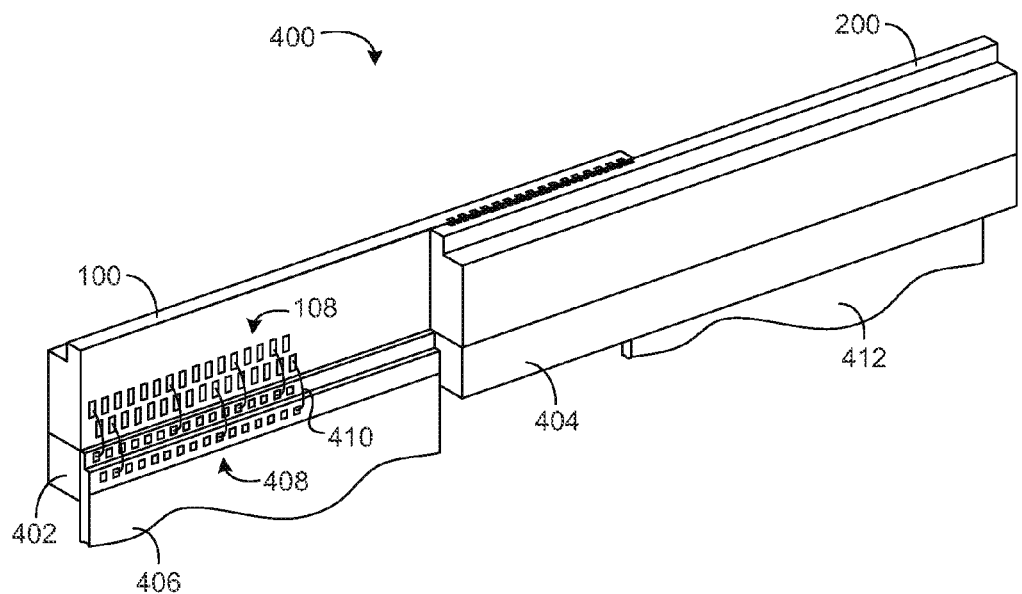
FIG. 4 depicts an isometric-like diagram of an arrangement including flexible circuits according to the present teachings.

Reference is made now to FIG. 4, which depicts an arrangement 400 according to the present teachings. The arrangement 400 is illustrative and non-limiting, and other respectively varying arrangements can also be used.

The arrangement 400 includes the read module 100 and the read module 200, in accordance with the arrangement 300 described above. The arrangement 400 also includes a support bar 402 and a support bar 404 in supportive contact with the read modules 100 and 200, respectively. Each of the support bars 402 and 404 can be formed from any suitable solid material such as plastic, aluminum, and so on.

The arrangement 400 also includes a flexible circuit or "ribbon" 406. The flexible circuit 406 includes a plurality of electrically distinct traces or conductive pathways defined by respective bonding terminations 408. Each termination 408 is wire bonded 410 to a respective one of the bond pads 108 such that electrical communication between the read elements (i.e., 104) and the flexible circuit 406 is defined. While only six wire bonds 410 are depicted in the interest of clarity, it is to be understood that every individual bond pad 108 is wire bonded to a corresponding one of the bonding terminations 408 in an actual embodiment. Such wire bonds 410 can be formed of gold or another suitable conductive material.

The arrangement 400 also includes another flexible circuit 412. The flexible circuit 412 includes a plurality of electrically distinct traces or conductive pathways defined by respective bonding terminations, analogous to the terminations 408. Each such termination is wire bonded to a respective one of the bond pads (i.e., 208) such that electrical communication between the read elements (i.e., 204) and the flexible circuit 412 is defined.

The arrangement 400 is illustrative of additional functional and structural aspects contemplated by the present teachings. In particular, various read/write head embodiments can be defined having BWC and native mode read modules that are separately coupled to electronic circuitry by way of flexible circuit ribbons.

Illustrative Dual Mode Read/Write Head

Figure 5:
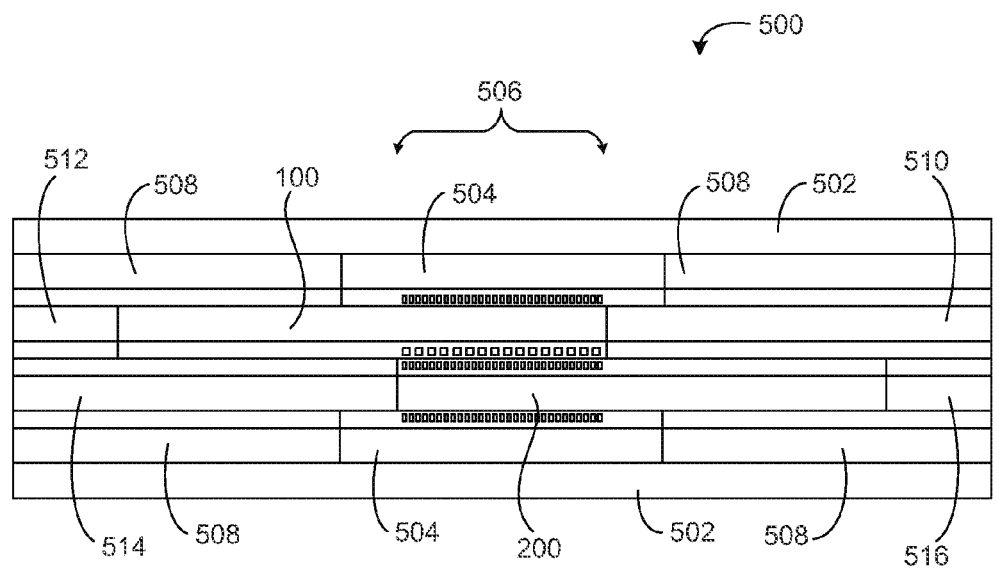
FIG. 5 depicts a plan diagrammatic view of read/write head in accordance with the present teachings.

Attention is directed now to FIG. 5, which depicts a plan view of a dual mode read/write head (head) 500 in accordance with the present teachings. The head 500 is configured to perform BWC and native mode tape reading, as well as native mode tape writing (i.e., recording). The head 500 is illustrative and non-limiting in nature, and other read heads or read/write heads are contemplated by the present teachings.

The head 500 includes respective tape guides 502, disposed on opposite sides of the head 500. The tape guides 502 can be formed from any suitable material such as a ceramic or ceramic-like composite, a plastic, and so on. The tape guides 502 are formed with a slight ramp-like slope aspect so as to guide a passing magnetic tape in very close, non-contacting adjacency over the other aspects of the head 500.

The head 500 also includes respective write modules 504, each disposed inward of the respective tape guides 502 and aligned with a tape reading/writing zone 506. Each of the write modules 504 is configured to write information to a magnetic recording tape in accordance with a present format, and is thus referred to as a native mode write module 504. The head 500 also includes respective end bars 508 disposed at opposite ends of respective write modules 504 so as to fill the space defining the overall length of the head 500. The end bars 508 can be formed from aluminum, plastic, ceramic or another suitable material.

The head 500 also includes a BWC read module 100 disposed toward a centralized location of the head 500, and aligned with the tape reading/writing zone 506. The BWC read module 100 is configured to read information from a magnetic recording tape in accordance with a prior generation format. The head includes a cover bar 510 and an end bar 512 disposed at opposite ends of the BWC read module 100 so as to fill the space defining the overall length of the head 500. The cover bar 510 and the end bar 512 can each be formed from aluminum, plastic, ceramic or another suitable material.

The head 500 further includes a native read module 200 disposed toward a centralized location of the head 500, and aligned with the tape reading/writing zone 506. The native read module 200 is configured to read information from a magnetic recording tape in accordance with a present format, as used by the write modules 504. The head includes a cover bar 514 and an end bar 516 disposed at opposite ends of the native read module 200 in order to fill out the overall length of the head 500. The cover bar 514 and the end bar 516 can each be formed from aluminum, plastic, cerammic or another suitable material.

The arrangement of elements of the head 500 are such that bidirectional writing of information in the native mode can be performed, and the integrity (or fidelity) of such just-recorded information verified by the native read module 200. In turn, prior generation information can be read (only) by the BWC read module 100.

Illustrative Method

Figure 6:
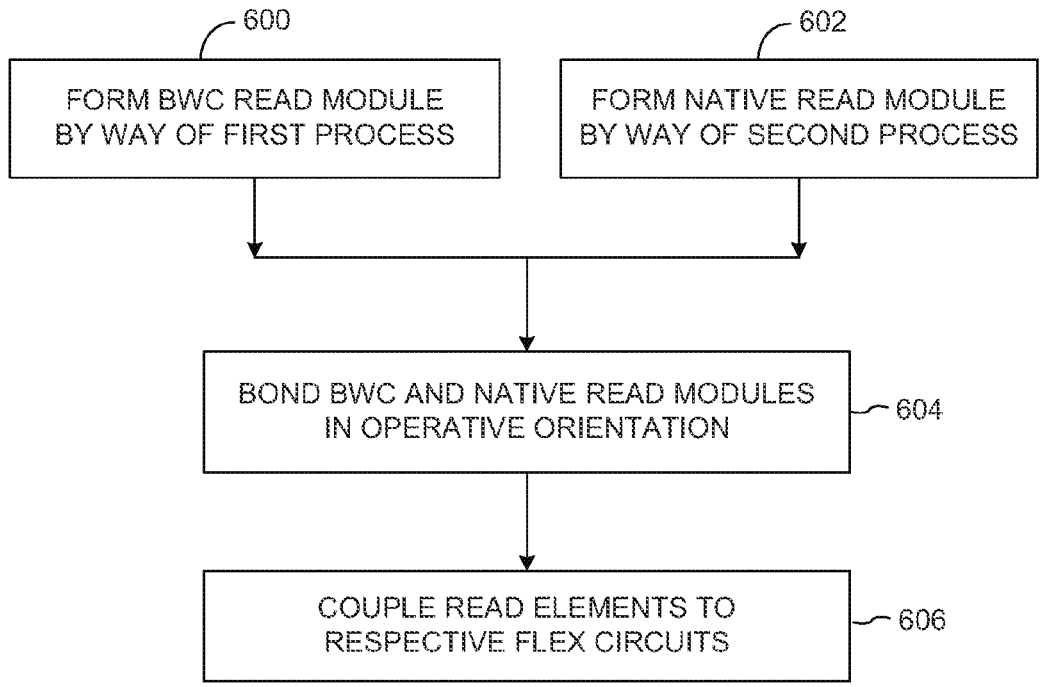
FIG. 6 depicts a flow diagram of a method in accordance with the present teachings.

Reference is made now to FIG. 6, which depicts a flow diagram of a method according to the present teachings. The method of FIG. 6 includes particular steps performed in a particular order of execution. However, other methods including other steps, omitting one or more of the depicted steps, or proceeding in other orders of execution can also be defined and used. Thus, the method of FIG. 6 is illustrative and non-limiting with respect to the present teachings. Reference is also made to FIGS. 1, 2, 3 and 4 in the interest of illustrating the method of FIG. 6.

At 600, a backward compatible read module is formed using a first process. In the present illustration, a BWC read module 100 is formed using a semiconductor substrate, at least in part by way of an Anisotropic Magneto-Resistive (AMR) process. The module 100 thus includes a plurality of read elements 104 electrically coupled to respective pairs of bond pads 108.

At 602, a native mode read module is formed using a first process. In the present illustration, a read module 200 is formed using a semiconductor substrate, at least in part by way of a Giant Magneto-Resistive (GMR) process. The module 200 thus includes a plurality of read elements 204 electrically coupled to respective pairs of bond pads 208. The steps 600 and 602 can be performed at different times, or contemporaneously (or partially so).

At 604, the BWC and native read modules are bonded in operative orientation. In the present illustration, the respective read modules 100 and 200 are directly bonded together in a parallel, partially overlapping orientation such that an arrangement 300 is defined. The respective rows of read elements 104 and 204 are aligned such that a single, continuous tape reading zone 302 is defined.

At 606, the read elements are coupled to respective flexible circuits. In the present illustration, the read elements 104 of the module 100 are coupled to circuit pathways of a flexible circuit 406 by way of wire bonding 410. In turn, the read elements 204 of the module 200 are coupled to circuit pathways of a flexible circuit 412 by way of wire bonding. The read modules 100 and 200 are now configured to communicate electrical signals to electronic circuitry in accordance with magnetically recorded information on a tape 304.

The method described immediately above is illustrative of steps performed toward formation of a read head, or read/write head, having both backward compatible (i.e., prior generation) and native mode (i.e., present generation) magnetic tape reading functionality. Additional elements such as support bars, a write module or modules, structural pieces, tape guides, and the like can be added so as to define such a complete head assembly.

Illustrative Tape Recording Apparatus

Figure 7:
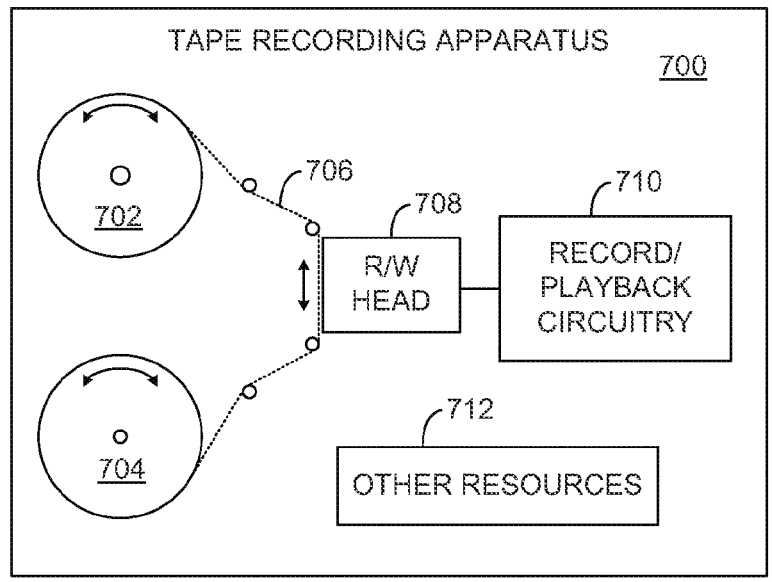
FIG. 7 depicts a block schematic diagram of a tape recording apparatus according to another example.

Attention is directed to now to FIG. 7, which depicts a tape recording apparatus (apparatus) 700 according to the present teachings. The apparatus 700 is illustrative and non-limiting in nature, and other apparatus, devices and system can also be used.

The apparatus 700 includes a first tape reel 702 and a second tape reel 704. Each of the reels 702 and 704 is configured to support (i.e., store, or accumulate) a length of magnetic recording tape 706 by way of spooling about the respective center thereof. The tape 706 can be bidirectionally transferred between the reels 702 and 704 along a pathway defined by respective guide rollers or similar elements.

The apparatus 700 also includes a read/write head 708. The head 708 is defined according to the present teachings, and therefore includes a BWC read module (e.g., 100) and a native read module (e.g., 200), as well as at least one native write module. The head 708 is configured to write (record) information onto the tape 706 in at least one native format, and to read (playback) information from the tape 706 in at least the BWC and native formats, by way of electromagnetic signaling.

The apparatus 700 also includes record/playback circuitry 710. The circuitry 700 is configured to receive signals from the head 708 during information playback, and provide signals to the head 708 during information recording. The circuitry 700 is also configured to amplify, encode or decode, perform analog-to-digital (ADC) or digital to analog (DAC) conversion, and so on, with respect to signals communicated to and from the head 708.

The apparatus 700 further includes other resources 712. The other resources 712 can include any required or desired constituency towards the normal functions of the apparatus 700. Non-limiting examples of such other resources 712 include a power supply, digital network communications circuitry, wireless communications circuitry, tape transport rotor drives and servos, a user interface or display, and so on. Such other resources 712 are respectively electrically or mechanically coupled to each other and/or the head 708, the circuitry 710, the respective reels 702 and 704, and so on, as needed.

In general, the present teachings contemplate systems and methods for making and using read modules compatible with respective older and newer recording formats. A first process, such as AMR, can be used to produce a read module having read elements in accordance with an older recording format. For example, such a prior generation can have wider track spacing and a limited voltage output as tape passes over it.

A second process, such as GMR, can be used to produce a read module having read elements in accordance with a newer or state-of-the-art recording format. For example, such a present generation can have narrower track spacing and higher voltage output per unit of magnetic flux compared to the prior generation. The separate production of read modules avoids damage done inadvertently to read elements or other features due to respective annealing parameters or other process steps.

Such respective read modules can be aligned and directly bonded together in parallel such that a single, continuous tape reading zone is defined. Flexible circuits are then electrically coupled to the respective read elements of the respective modules, and additional elements added to define a complete read or read/write head. Tape recording or playback (or both) apparatuses, having read modules in accordance with the present teachings, can be defined and used.

In general, the foregoing description is intended to be illustrative and not restrictive. Many embodiments and applications other than the examples provided would be apparent upon reading the above description. It is anticipated and intended that future developments will occur in the arts discussed herein, and that the disclosed systems and methods will be incorporated into such future embodiments.

What is claimed is:

1. A magnetic tape head, comprising:
   a first read module having a plurality of first read elements arranged in a row according to a first track density format;
   a second read module having a plurality of second read elements arranged in a row according to a second track density format different than the first, respective portions of the first and second read modules directly bonded to each other such that the first and second read elements are parallel and aligned to define a single continuous tape reading zone; and
   the first and second read modules each defining a face having plural bond pads disposed thereon, the first and second read modules disposed in a partially overlapping face-to-face ends of the tape reading zone.

2. The magnetic tape head according to claim 1 further comprising a write module having a plurality of write elements arranged in a row according to the second track density format, the row of write elements aligned with the tape reading zone.

3. The magnetic tape head according to claim 1, the first and second read modules respectively such that the first track density format is less than the second track density format.

4. The magnetic tape head according to claim 1 further comprising a first write module and a second write module, each of the write modules having a plurality of write elements arranged in a row according to the second track density format, the first and second write, modules disposed on opposite sides of the read modules such that the respective rows of write elements are aligned with the tape reading zone.

5. The magnetic tape head according to claim 1 further comprising:
   a first flexible circuit electrically coupled to the first read elements;
   a second flexible circuit electrically coupled to the second read elements;
   the first and second flexible circuits respectively disposed proximate to opposite ends of the tape reading zone.

6. A magnetic tape bead, comprising:
   a first module having a plurality of read elements to read magnetically recorded information of a first format, the first module defined by a first face;
   a second module having a plurality of read elements to read magnetically recorded information of a second format, the second module defined by a second face, a track density of the second format being greater than a track density of the first format;
   the first and second modules joined by directly bonded respective portions of the first and second faces to each other such that respective rows of the read elements are in parallel orientation with each other defining, a single tape bearing surface; and
   corresponding bond pads disposed on the first and second faces, the first and second modules disposed in a partially overlapping face-to-face orientation such that the corresponding bond pads are disposed proximate to opposite ends of the tape bearing surface.

7. The magnetic tape head according to claim 6, wherein the respective rows of the read elements are disposed within a tape reading zone characterized by a width, the width of the tape reading zone being less than a width of at least the second format.

8. The magnetic tape head according to claim 6 further comprising:
   a plurality of pairs of bond pads on the first module, each pair being electrically coupled to a respective one of the read elements of the first module; and
   a plurality of pairs of bond pads on the second module, each pair being electrically coupled to a respective one of the read elements of the second module.

9. The magnetic tape head according to claim 6 further comprising:
   a first flexible circuit electrically coupled to the first module by way of the corresponding bond pads;
   a second flexible circuit electrically coupled to the second module by way of the corresponding bond pads;
   the first and second modules supported by way of one or more support bars;
   the first flexible circuit bonded to one of the support bars proximate to the bond pads of the first module; and
   the second flexible circuit bonded to one of the support bars proximate to the bond pads of the second module.

10. The magnetic tape head according to claim 6, the read elements of the first module corresponding to a prior generation of magnetic tape recording format relative to the read elements of the second module.

* * * * *

UNITED STATES PATENT AND TRADEMARK OFFICE
CERTIFICATE OF CORRECTION

Page 1 of 1

PATENT NO. : 8,730,615 B1
APPLICATION NO. : 13/660738
DATED : May 20, 2014
INVENTOR(S) : Paul W. Poorman It is certified that error appears in the above-identified patent and that said Letters Patent is hereby corrected as shown below:

In the Claims:

In column 7, line 34, in Claim 1, after "face-to-face" insert -- orientation such that the respective pluralities of bond pads are disposed proximate to opposite --.

In column 7, line 47, in Claim 4, delete "write," and insert -- write --, therefor.

In column 8, line 5, in Claim 6, delete "bead," and insert -- head, --, therefor.

In column 8, line 17, in Claim 6, delete "defining," and insert -- defining --, therefor.

Signed and Sealed this
Ninth Day of September, 2014

Michelle K. Lee
*Deputy Director of the United States Patent and Trademark Office*